US010200529B2

(12) United States Patent
Stuntebeck et al.

(10) Patent No.: US 10,200,529 B2
(45) Date of Patent: Feb. 5, 2019

(54) RESTRICTIONS ON MOBILE DEVICE USAGE WHEN DRIVING A VEHICLE

(71) Applicant: AirWatch LLC, Atlanta, GA (US)

(72) Inventors: Erich Peter Stuntebeck, Marietta, GA (US); Kar Fai Tse, Peachtree Corners, GA (US); Chen Lu, Sandy Springs, GA (US)

(73) Assignee: AIRWATCH LLC, Atlanta, GA (US)

( * ) Notice: Subject to any disclaimer, the term of this patent is extended or adjusted under 35 U.S.C. 154(b) by 557 days.

(21) Appl. No.: 14/498,253

(22) Filed: Sep. 26, 2014

(65) Prior Publication Data

US 2016/0094707 A1 Mar. 31, 2016

(51) Int. Cl.
H04W 4/90 (2018.01)
H04W 4/02 (2018.01)
H04M 11/04 (2006.01)
H04M 1/725 (2006.01)
H04W 64/00 (2009.01)
H04M 1/60 (2006.01)

(52) U.S. Cl.
CPC ..... H04M 1/72577 (2013.01); H04W 64/006 (2013.01); H04M 1/6091 (2013.01); H04M 2250/10 (2013.01); H04M 2250/12 (2013.01); H04M 2250/52 (2013.01)

(58) Field of Classification Search
CPC ......... H04M 1/72577; H04M 1/72569; H04M 1/72572; H04M 2250/52; H04M 11/04; H04M 1/6091; H04M 2250/10; H04W 4/027; H04W 64/00; H04W 52/0254; H04W 8/02; H04W 4/90; H04W 76/50; H04W 64/90; G06K 9/00832

USPC ............... 455/412.2, 418–420, 414.1–414.4, 455/456.1–456.6

See application file for complete search history.

(56) References Cited

U.S. PATENT DOCUMENTS

| | | | |
|---|---|---|---|
| 2011/0039581 A1* | 2/2011 | Cai | G01S 19/14 455/456.4 |
| 2012/0238252 A1* | 9/2012 | Levitan | H04L 63/102 455/414.1 |
| 2013/0344859 A1* | 12/2013 | Abramson | H04M 1/72577 455/418 |
| 2014/0134992 A1* | 5/2014 | Ludick | G06K 9/00832 455/418 |
| 2014/0136187 A1* | 5/2014 | Wolverton | G06F 17/30654 704/9 |
| 2014/0256303 A1* | 9/2014 | Jones | H04W 4/027 455/418 |
| 2015/0002674 A1* | 1/2015 | Kleve | H04N 7/18 348/149 |
| 2015/0019057 A1* | 1/2015 | Morisaki | B60L 7/18 701/22 |

(Continued)

Primary Examiner — Khawar Iqbal
(74) Attorney, Agent, or Firm — Thomas | Horstemeyer, LLP

(57) ABSTRACT

Disclosed are various embodiments for restricting usage of a mobile device when a user is driving a vehicle. In one embodiment, it is determined that a mobile device is in use by a driver of an active vehicle. A functionality of the mobile device is then restricted based at least in part on determining that the mobile device is in use by the driver of the active vehicle. For example, a touch screen of the mobile device may be disabled, and the use of a hands-free interface may be made mandatory.

25 Claims, 7 Drawing Sheets

(56) References Cited

U.S. PATENT DOCUMENTS

| | | | |
|---|---|---|---|
| 2015/0073692 A1* | 3/2015 | Malikopoulos | B60W 50/14 |
| | | | 701/123 |
| 2015/0312404 A1* | 10/2015 | Abramson | H04W 4/027 |
| | | | 455/418 |
| 2015/0312474 A1* | 10/2015 | Lavi | H04N 5/23216 |
| | | | 348/231.6 |
| 2016/0014265 A1* | 1/2016 | Ludick | G06K 9/00832 |
| | | | 455/418 |

\* cited by examiner

RESTRICTIONS ON MOBILE DEVICE USAGE WHEN DRIVING A VEHICLE

BACKGROUND

People are becoming increasingly reliant on their mobile devices such that they take and use their mobile devices wherever they go. Smartphones, wearables, tablets, and so on may be used at home or in the office, while at a sporting event, or even while on vacation in the mountains or at the beach. It is unsurprising that, given the amount of time that people spend in their vehicles, people are likely to use their mobile devices while driving. However, using mobile devices while driving may lead to distracted driving, and potentially, to accidents, injuries, or even death. Accordingly, many jurisdictions have banned texting while driving, and many jurisdictions have mandated the use of hands-free devices for telephone calls while driving.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to placing restrictions on mobile device usage when the user of a mobile device is driving a vehicle. Distracted driving is a common problem and will be increasingly so as people become dependent on mobile devices. Numerous jurisdictions now proscribe texting while driving or even talking on a mobile device without a hands-free interface. Despite legal requirements, people continue to use their mobile devices while driving in a potentially dangerous manner.

Another issue that may arise relates to liability. If the user of the mobile device is an employee of an enterprise, and if the employee is doing enterprise-related work via the mobile device while driving, there may be an argument that liability for an accident may be imputed to the enterprise. Accordingly, it may be in the best interest of the enterprise to ensure that their employees are not using mobile devices inappropriately to perform enterprise-related functions while driving.

Various embodiments of the present disclosure present approaches to place restrictions on mobile device usage by drivers. First, the embodiments provide approaches to determine when a mobile device is being used by a driver of a vehicle. Second, the embodiments provide approaches to implement appropriate restrictions when such a determination is made. The embodiments disclosed herein may be particularly appropriate when in the context of a mobile device management system that is configured to manage applications and data present on a mobile device on behalf of an enterprise. However, it is understood that the embodiments disclosed herein may be generally deployed for the public good and/or to ensure compliance with laws relating to mobile device usage while driving. Parents of teen drivers, insurance companies, and others may also see fit to deploy these approaches.

Figure 1:
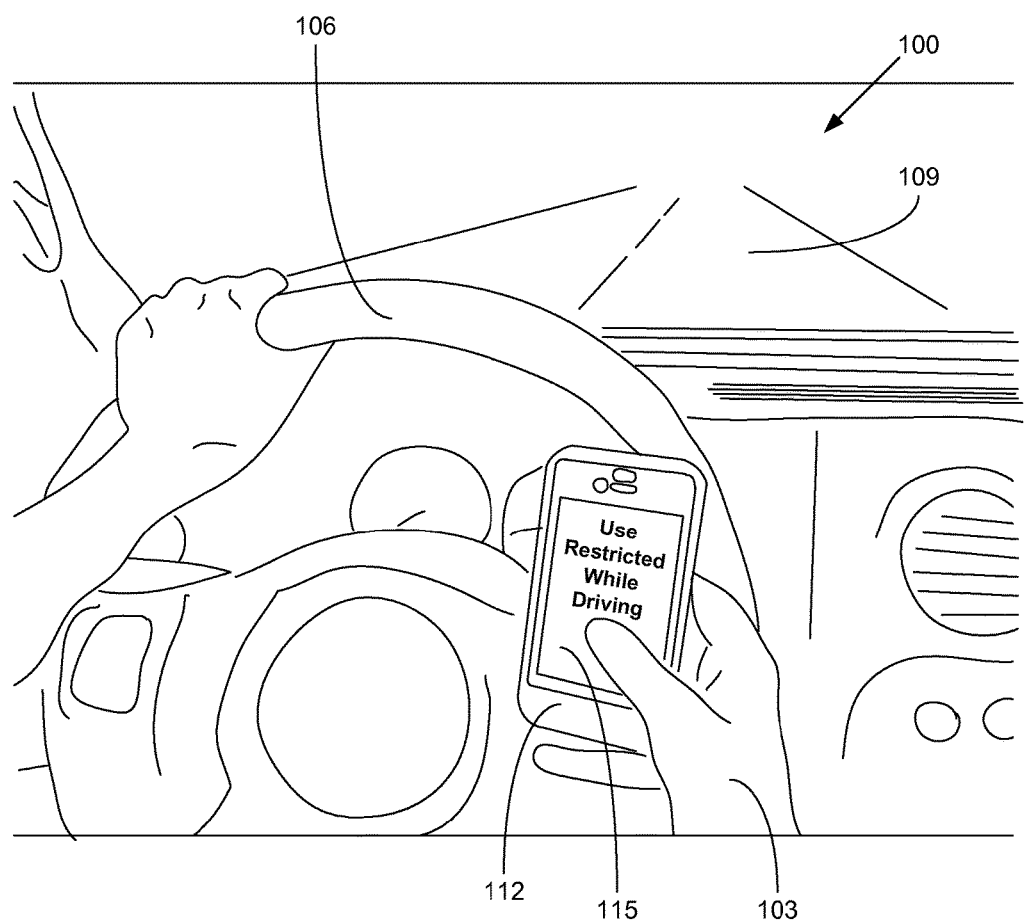
FIG. 1 is a drawing of a vehicle environment that corresponds to an example usage scenario according to various embodiments of the present disclosure.

FIG. 1 illustrates a drawing of a vehicle environment 100 that corresponds to an example usage scenario according to various embodiments. In the vehicle environment 100, a user 103 is shown driving behind the steering wheel 106 of a vehicle. In addition to gripping the steering wheel 106 in his or her left hand and navigating the vehicle forward on a road 109, the user is also gripping a mobile device 112 in his or her right hand. Ostensibly, the user 103 may be intending to check notifications or to send a text message. This is a potentially dangerous and/or illegal scenario.

In response to detecting that the user 103 is driving, the display 115 of the mobile device 112 renders a message "Use Restricted While Driving." That is to say, the mobile device 112 has restricted the user 103 from checking notifications, sending a text message, or performing any number of other potentially dangerous functions via the display 115. In addition, the mobile device 112 may have enabled a hands-free interface, a text-to-speech interface, and/or other functionality to allow the user 103 to use the mobile device 112 in a safer manner that does not involve looking at the display 115 or typing using an on-screen keyboard.

Figure 2:
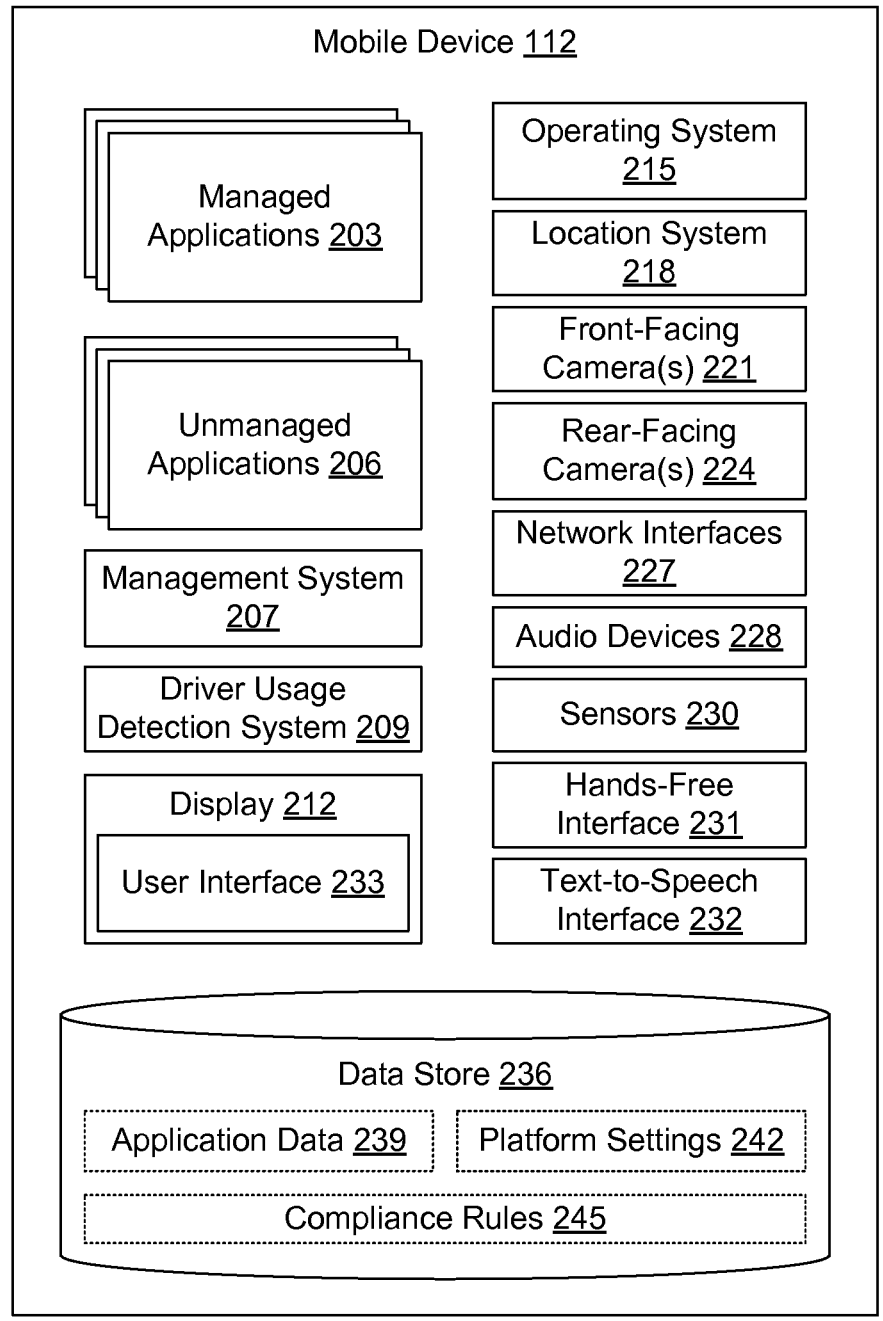
FIG. 2 is a diagram of one example of a mobile device according to various embodiments of the present disclosure.

With reference to FIG. 2, shown is a diagram of one example of a mobile device 112 according to various embodiments. The mobile device 112 may comprise, for example, a processor-based system such as a computer system. Such a mobile device 112 may be embodied in the form of a laptop computer, personal digital assistant, cellular telephone, smartphone, music player, web pad, tablet computer system, electronic book reader, wearable computing devices (e.g., watches, glasses), or other devices with like capability.

The mobile device 112 may include various components such as one or more managed applications 203, one or more unmanaged applications 206, a management system 207, a driver usage detection system 209, a display 212, an operating system 215, a location system 218, one or more front-facing cameras 221, one or more rear-facing cameras 224, one or more network interfaces 227, one or more audio devices 228, one or more sensors 230, a hands-free interface 231, a text-to-speech interface 232, and/or other components. Some of these components may be associated with specialized hardware of the mobile device 112, such as input or output devices. Others of these components may comprise executable instructions that may be executed by processors of the mobile device 112.

The managed applications 203 may correspond to applications executable upon the mobile device 112 that are managed by an organization, such as an enterprise. The managed applications 203 may be configured to adhere to various policies of the organization by the management system 207. The unmanaged applications 206 may correspond to applications pre-installed or installed by a user which are not managed by the management system 207. The managed applications 203 and/or unmanaged applications 206 may include browser applications, social networking applications, productivity applications, text messaging applications, mapping applications, email applications, and/or a variety of other applications. The managed applications 203 and/or unmanaged applications 206 may include native applications, web-based applications, hybrid applications, and/or other applications.

According to various embodiments, the managed applications 203 may be subject to restrictions based on whether the mobile device 112 is in use by a driver of an active vehicle, while the unmanaged applications 206 may be subject to no such restrictions. In other embodiments, the managed applications 203 may be restricted from use by a driver of an active vehicle according to organization compliance rules that the mobile device 112 obtains from a remote server, while the unmanaged applications 206 may be restricted from use by a driver of an active vehicle according to a basic default policy of the mobile device 112.

The driver usage detection system 209 is configured to detect when the mobile device 112 is in use by a user who is driving a motor vehicle. In response to such detection, the management system 207 and/or other systems of the mobile device 112 may be configured to enforce various restrictions upon the use of the mobile device 112. Further, the driver usage detection system 209 may be configured to detect when the mobile device 112 is no longer in use by a driver of a motor vehicle. In some embodiments, override features may be provided to enable a driver to continue to use various functionality of the mobile device 112.

The display 212 may comprise, for example, one or more devices such as liquid crystal display (LCD) displays, gas plasma-based flat panel displays, organic light emitting diode (OLED) displays, electrophoretic ink (E ink) displays, or other types of display devices, etc. In several embodiments, the display 212 may comprise a touchscreen display that is both an input device and an output device. A user interface 233 may be rendered upon the display 212.

An operating system 215 may be executed in the mobile device 112. Non-limiting examples of the operating system 215 may include ANDROID, IOS, WINDOWS PHONE, BLACKBERRY OS, and so on. The operating system 215 in some cases may provide an application programming interface (API) that allows the management system 207 to disable or enable various functionality of the mobile device 112.

The location system 218 is operable to determine the location of the mobile device 112. For example, the location system 218 may comprise a global positioning system (GPS) sensor, an altitude sensor, and/or other sensors relevant to determining location. The location system 218 may rely on GPS coordinates, proximity to known wireless access points, proximity to cellular telephone towers, and/or other approaches to determining location.

In various embodiments, the mobile device 112 may include one or more front-facing cameras 221 and one or more rear-facing cameras 224. A front-facing camera 221 corresponds to one that faces a user when the user is looking at the display 212, while a rear-facing camera 224 corresponds to one that faces the direction that the user is looking, when the user is looking at the display 212. Other cameras and light sensors may be included in the mobile device 112.

The mobile device 112 may include one or more network interfaces 227, which may include wireless local area network (WLAN) interfaces such as WI-FI, personal area network (PAN) interfaces such as BLUETOOTH and near-field communication (NFC), cellular communication interfaces, infrared interfaces, acoustically coupled interfaces, and others. The audio devices 228 may include microphones, line-in interfaces, speakers, line-out interfaces, and/or other forms of audio devices 228. For example, the audio devices 228 may include a speaker designed for a user to hold up to his or her ear and another speaker designed to play audio more loudly for those within several feet of the mobile device 112. The sensors 230 may include light sensors, heart rate sensors, touch sensors, accelerometers, gyroscopes, and/or other types of sensors. The sensors 230 may also include other input devices such as buttons, physical keyboards, biometric scanners, and so on. One or more of the audio devices 228 (such as microphones) may also be considered sensors 230.

The hands-free interface 231, when enabled, may allow a user to make phone calls and/or perform other functions without having to hold or look at the mobile device 112. The hands-free interface 231 may employ a wired headset mode, a wireless headset mode, a speakerphone mode, and/or modes using other audio devices 228. The text-to-speech interface 232 is configured to produce an auditory representation of text through an audio device 228 so that a user does not have to read text upon the display 212.

Also, various data is stored in a data store 236 that is accessible to the mobile device 112. The data store 236 may be representative of a plurality of data stores 236 as can be appreciated. The data store 236 may include, for example, application data 239, platform settings 242, compliance rules 245, and/or other data.

The application data 239 comprises data used by the managed applications 203 and/or the unmanaged applications 206. The platform settings 242 may include configuration settings relevant to the particular platform implemented by the operating system 215. For example, a platform setting 242 may indicate whether text is to be read by a text-to-speech interface 232.

The compliance rules 245 may correspond to policy rules that are enforced by the management system 207. For example, a compliance rule 245 may dictate that a particular managed application 203 may not be used when a user is driving. One compliance rule 245 may dictate that a particular managed application 203 may not be used when a user is driving above a certain threshold speed, while another compliance rule 245 may dictate that a particular managed application 203 may not be used when a user is driving below a certain threshold speed (e.g., for applications 203 that are safe to be used when the user is driving at highway speeds). Compliance rules 245 may also specify remedial actions to be taken when a certain event occurs (e.g., upon non-compliance with security requirements). For example, the compliance rules 245 may specify that use of a managed application 203 is to be disabled when the mobile device 112 is in use by a driver of an active vehicle.

Figure 3:
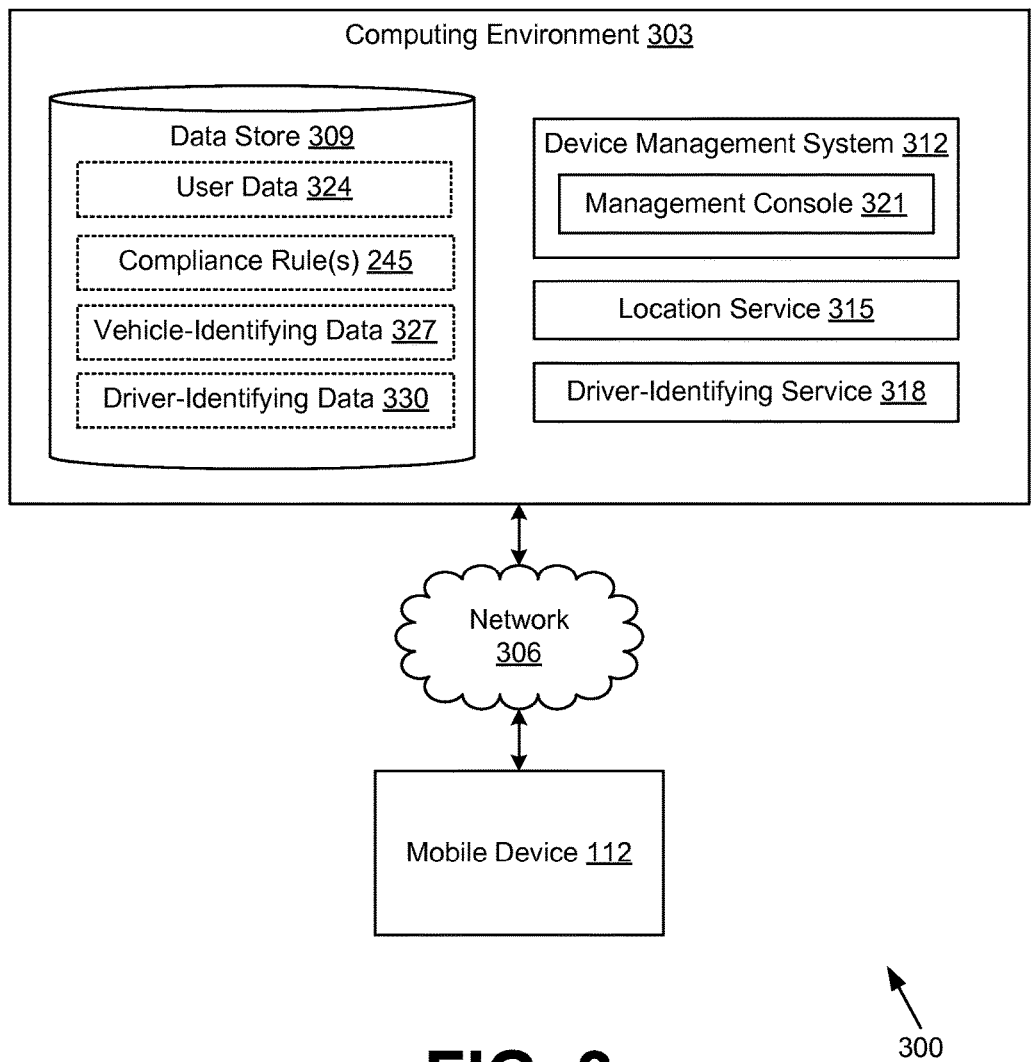
FIG. 3 is a schematic block diagram of a networked environment including the mobile device of FIG. 2 according to various embodiments of the present disclosure.

Moving on to FIG. 3, shown is a networked environment 300 according to various embodiments. The networked environment 300 includes a computing environment 303 and one or more mobile devices 112, which are in data communication via a network 306. The network 306 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted or "cloud" computing resource, a grid computing resource, and/or any other distributed computing arrangement. In some cases, the computing environment 303 may correspond to an elastic computing resource where the allotted capacity of processing, network, storage, or other computing-related resources may vary over time. The computing environment 303 may also include or correspond to one or more virtualized server instances that are created in order to execute the functionality that is described herein.

Various applications and/or other functionality may be executed in the computing environment 303 according to various embodiments. Also, various data is stored in a data store 309 that is accessible to the computing environment 303. The data store 309 may be representative of a plurality of data stores 309 as can be appreciated. The data stored in the data store 309, for example, is associated with the operation of the various applications and/or functional entities described below.

The components executed on the computing environment 303, for example, may include a device management system 312, a location service 315, a driver identification service 318, and other applications, services, processes, systems, engines, or functionality not discussed in detail herein.

The device management system 312 may be executed to manage and/or oversee the operation of multiple mobile devices 112. For example, an employer may operate the device management system 312 to ensure that the mobile devices 112 of its employees are operating in compliance with various compliance rules 245. By ensuring that the mobile devices 112 of its employees are operated in compliance with the compliance rules 245, the employer may control and protect access to various data. Moreover, enforcing the compliance rules 245 may influence the behavior of the employees with respect to safety and reduce potential liability for the employer. The device management system 312 may also facilitate access to email, calendar data, contact information, documents, or other enterprise data to which an enterprise may wish to provide access by users via mobile devices 112. The device management system 312 may be executed on virtualized server instances in the computing environment 303 of an enterprise and may be used to control large numbers of mobile devices 112 by interfacing with applications installed on the mobile devices 112 by way of the network 306.

In one embodiment, the device management system 312 may provide a management console 321 and/or other components. The management console 321 is executed to facilitate administration and/or management of mobile devices 112 that are associated with users accessing enterprise resources, such as mailbox data, calendar data, contact data, and/or user documents. In some embodiments, the management console 321 can provide a user interface accessible by an administrator through which the administrator may enroll, activate, remove, deactivate, or otherwise manage devices that are employed to access resources via an application or service provided by the computing environment 303. Such a user interface can also allow an administrator to define compliance rules 245 with respect to usage of mobile devices 112 that are assigned to various users of an enterprise. The management console 321 may also enable modification of the compliance rules 245 by an administrator. When a modification to the compliance rules 245 is detected, the device management system 312 may be configured to push updates to the mobile devices 112 that are managed. Alternatively, the mobile devices 112 may be configured to poll the device management system 312 for updates to the compliance rules 245.

In some embodiments, the management console 321 may also determine compliance of mobile devices 112 associated with a particular user with compliance rules 245 in response to a request received from an application executed by a mobile device 112. The computing environment 303 may also execute other applications to facilitate interactions with a mobile device 112, such as an application distribution service that distributes applications and/or updates to applications to the mobile device 112, a mail server that provides email services and/or functionality, a document storage application that provides remote document storage capability for users of an enterprise, or other applications or services that an enterprise may deploy to provide services for its users. Description of such applications or services is not necessary for a complete understanding of embodiments of the disclosure.

The location service 315 may be executed to receive location information requests from mobile devices 112 and to provide location information in response. For example, the mobile device 112 may send a location information request with GPS coordinates, wireless access point names, etc., and the location service 315 may provide information indicating that the location is in a certain building, on a certain street, within a mass transportation vehicle such as a bus or train, and/or other information.

The driver identification service 318 may be executed to receive a service request from the mobile device 112 and to respond with an indication of whether the information specified in the request identifies a driver or a non-driver. For example, various images captured by the mobile device 112, or information derived thereof, may be submitted to the driver identification service 318 for further analysis.

The data stored in the data store 309 includes, for example, user data 324, compliance rules 245, vehicle-identifying data 327, driver-identifying data 330, and potentially other data. The user data 324 can include data associated with a user account, such as user profile information. User profile information can include information about a user's role within an organization, an office address or location, home address or location, permissions, and/or privileges with respect to usage of an enterprise device. Certain users in an enterprise may be classified differently from other users. For example, a user who travels extensively for business may be granted certain privileges with respect to usage of a device managed by the enterprise, such as the ability to use certain features of the mobile device 112 while driving. As another example, users who are designated as company executives may be granted privileges with respect to usage of a mobile device managed by the enterprise, while entry-level employees may not be granted those privileges.

User data 324 can also include access settings, such as authentication credentials, delegation settings (e.g., information about other users who may be provided access to the user data 324 of a particular user), mail and document retention rules and/or policies, and/or other geographic access restrictions or limitations (e.g., information about certain locations and/or networks from which user data 324 can be accessed). User data 324 can also include other account settings, such as biographical or demographic information about a user, password reset information, multifactor authentication settings, and other data related to a user account as can be appreciated. User data 324 can also include other forms of data associated with users of an enterprise's computing resources that are not shown, such as a user's mailbox data, calendar data, contact data, and information about the various devices, such as device identifiers, that are assigned to the user and managed in some form by the management console 321. For example, mailbox data includes data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user.

Calendar data can include, for example, appointments, reminders, tasks and/or other data that can be associated with a timestamp or date stamp. Calendar data can include appointments that are associated with a particular location and/or user. For example, an appointment can be linked with a particular location, meeting room, building, address, or other location. An appointment can also be linked with another user who is internal or external to an organization or domain of the user as well as with text and/or attachments. Calendar data can also include tasks, reminders, or other types of data that can be associated with a time and/or place and placed on a calendar.

Contact data can include personal information manager (PIM) or address book information related to contacts of a particular user such as internal or external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. It should be appreciated that a mobile device 112 of a user may also be synchronized with various other forms of data other than the types of data that are discussed above and that the above examples are discussed merely for illustrative and explanatory purposes.

Compliance rules 245 can be stored on the data store 309 and/or on the mobile device 112 and represent enterprise rules or requirements with which a user and/or a mobile device 112 must or should comply. For example, a compliance rule 245 can specify that a mobile device 112, in order to access user data 324, must execute a particular version of a mail client. As another example, a compliance rule 245 may specify that in order to read a text message while driving, the user must enter a password, a PIN code, solve a Completely Automated Public Turing test to tell Computers and Humans Apart (CAPTCHA), or submit a confirmation that they acknowledge violating a policy.

Additionally, certain compliance rules 245 may be enforced depending upon the location of the mobile device 112. For example, certain compliance rules 245 may be triggered when the location of the mobile device 112 is detected to be within or outside of a certain geographic area, or when the mobile device 112 is connected to a particular network 306. For example, texting while driving may be illegal in one state, but not in another. Thus, the compliance rule 245 may indicate that texting while driving is to be restricted in the state in which it is illegal, but not in the state in which it is legal.

Other compliance rules 245 may concern time constraints. For example, compliance rules 245 may prohibit uses only during certain time windows (e.g., during the work day, outside of the work day, and so on).

Accordingly, in this sense, a compliance rule 245 can specify a condition and a subsequent action to be taken or a restriction to be imposed in response to the condition being met. For example, a compliance rule 245 can specify that if a particular condition is met with respect to a location of a mobile device 112, an identity of a user, etc., then a particular action should be taken or a particular restriction should be imposed on a user's ability to use the mobile device 112 while driving.

The vehicle-identifying data 327 includes data that may be used by the location service 315 to determine whether a location corresponds to an active vehicle. The vehicle-identifying data 327 may be used to determine whether a mobile device 112 is above a road or a sidewalk, on a pedestrian, in a bus, train, or other mass transportation vehicle, or in a private vehicle. The vehicle-identifying data 327 may include various thresholds to determine whether a certain speed corresponds to movement of a vehicle, movement of a jogger, or some error in location reporting. In various embodiments, a vehicle that is moving may be considered an active vehicle, a vehicle that is turned on may be considered an active vehicle, or simply a vehicle with occupants may be considered an active vehicle. Whether a vehicle is an active vehicle may be determined by recording audio and determining whether signatures of engine noise are present (e.g., particular frequencies associated with engine noise), determining whether the mobile device 112 is connected to a BLUETOOTH of the vehicle, or determining anything else that would require the keys of the vehicle to be in the ignition.

The driver-identifying data 330 includes data that may be used by the driver identification service 318 to determine whether a person in an active vehicle is a driver of the active vehicle. For example, the driver-identifying data 330 may include data configuring the recognition of a lack of a fixed gaze upon a display 212 (FIG. 2) of the mobile device 112. In some cases, anyone who sits in a driver's seat may be considered the driver of the vehicle, regardless of whether the vehicle is actually in motion. The definition of a driver may be established at least in part by a legal definition, which may vary among jurisdictions.

Figure 4:
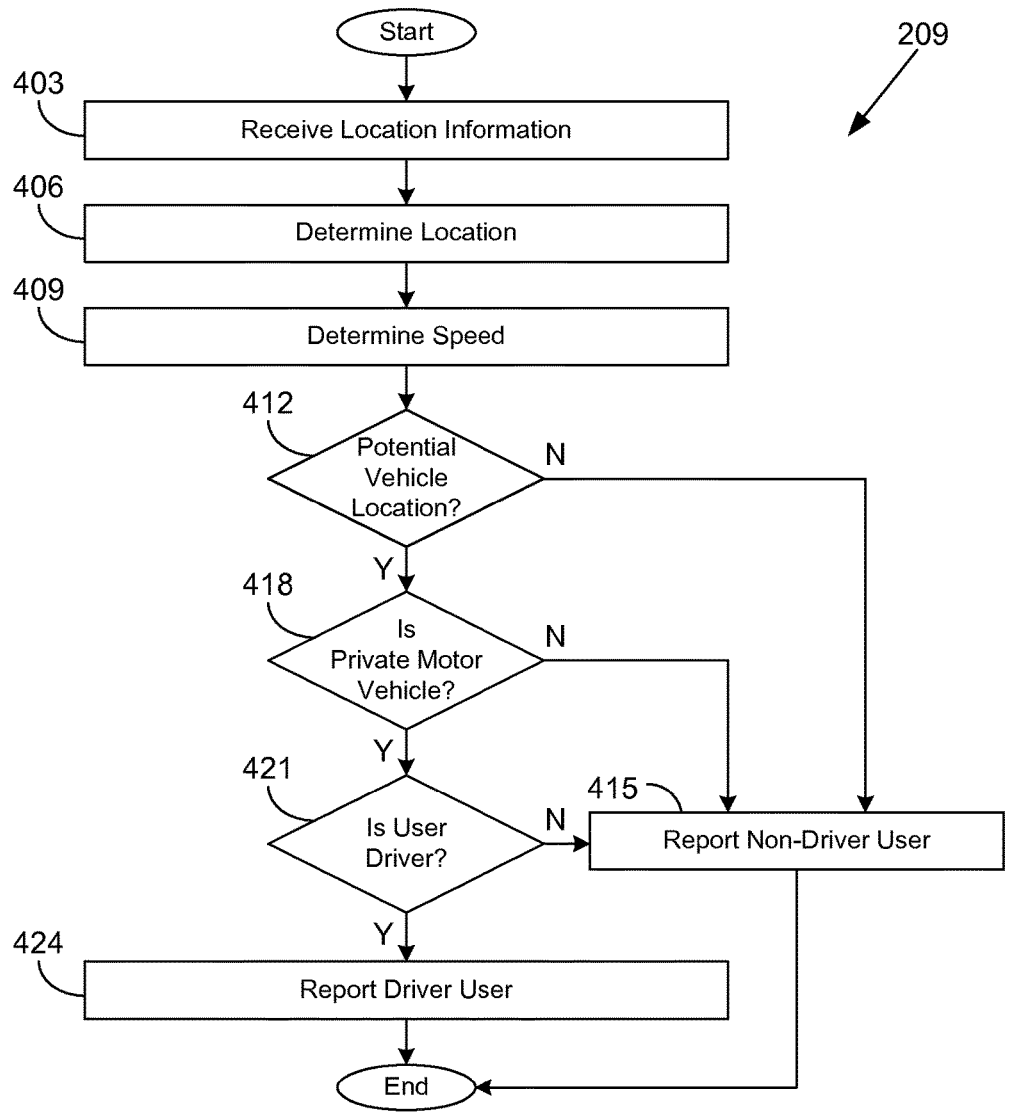
FIG. 4 is a flowchart illustrating one example of functionality implemented as portions of a driver usage detection system executed in the mobile device of FIG. 2 according to various embodiments of the present disclosure.

Referring next to FIG. 4, shown is a flowchart that provides one example of the operation of a portion of the driver usage detection system 209 according to various embodiments. It is understood that the flowchart of FIG. 4 provides merely an example of the many different types of functional arrangements that may be employed to implement the operation of the portion of the driver usage detection system 209 as described herein. As an alternative, the flowchart of FIG. 4 may be viewed as depicting an example of elements of a method implemented in mobile device 112 (FIG. 2) according to one or more embodiments.

Beginning with box 403, the driver usage detection system 209 receives location information from a location system 218 (FIG. 2). For example, the driver usage detection system 209 may receive a set of GPS coordinates or other geographic positional information. In some cases, the driver usage detection system 209 may submit raw location information to the location service 315 (FIG. 3) and obtain more detailed location information. In one embodiment, the driver usage detection system 209 initially receives coarse-grained information from the location system 218 in order to save power, and the driver usage detection system 209 may decide to "wake up" the location system 218 to determine more specific location information.

In box 406, the driver usage detection system 209 determines the location of the mobile device 112 using the location information that was received from the mobile device 112. In this regard, the driver usage detection system 209 may determine specific geographic features to which the geographic location corresponds. Such geographic features may include buildings, parks, streets, parking decks, forests, bodies of water, bridges, and so on. Again, the driver usage detection system 209 may obtain more detailed information from the location service 315 in order to determine the geographic features.

In box 409, the driver usage detection system 209 determines the speed of the mobile device 112. The speed of the mobile device 112 may be ascertained using multiple location readings and the time elapsed between the readings. In some cases, the speed may be inferred based at least in part on acceleration information provided by an accelerometer or other device. Also, in some cases, speed data may be obtained from the vehicle itself (e.g., through the use of a sensor network of the vehicle). In some cases, speed may be irrelevant, and a vehicle may be considered an active vehicle simply by being turned on or having occupants.

In box 412, the driver usage detection system 209 determines whether the current location is a potential vehicle location. For example, the current location may be a potential vehicle location if it is a street, a bridge, a parking lot, a parking deck, a driveway, or any other location where a vehicle might be located. However, the current location may not be a potential vehicle location if it is in a building, over a body of water, on a trail or sidewalk for non-motorized vehicles, and so on. If the current location is determined not to be a potential vehicle location, the driver usage detection system 209 moves to box 415 and reports that the user of the mobile device 112 is a non-driver user. Thereafter, the portion of the driver usage detection system 209 ends.

Otherwise, if the location is a potential vehicle location, the driver usage detection system 209 continues from box 412 to box 418. In box 418, the driver usage detection system 209 determines whether the location corresponds to a private motor vehicle of which the user may be a driver. For example, the driver usage detection system 209 may determine whether the locations have characteristics that correspond to routes of a train, streetcar, bus, or other mass transportation vehicle. The locations may correspond to a train if they follow a predefined route corresponding to a train line. The locations may correspond to a bus if they originate at a published bus stop and follow subsequent bus stops. The locations may be upon a bus line or train line if a wireless access point name corresponding to a bus line or train line is continuously detected. In one embodiment, such vehicles may be ruled out. In another embodiment, such vehicles are not ruled out, as the user may be the driver of the bus, train, etc.

Also, the driver usage detection system 209 may determine whether the locations correspond to a runner, jogger, or other type of pedestrian, which may be ruled out. Further, the driver usage detection system 209 may determine whether the locations correspond to a non-motorized bike, which may or may not be ruled out in some embodiments. If the mobile device 112 is not in a private motor vehicle, the driver usage detection system 209 continues to box 415 and reports that the user of the mobile device 112 is a non-driver user. Thereafter, the portion of the driver usage detection system 209 ends.

If it is determined that the mobile device 112 is in a private motor vehicle, the driver usage detection system 209 moves from box 418 to box 421. In box 421, the driver usage detection system 209 determines whether the user is in fact a driver, as opposed to merely a rider in the vehicle.

Various approaches may be employed to assess whether a user in a private motor vehicle is a driver. For example, the driver usage detection system 209 may ascertain using a front-facing camera 221 (FIG. 2) of the mobile device 112 whether the user has a fixed gaze upon the display 212 (FIG. 2) of the mobile device 112. It may be the case that drivers are unlikely to maintain a fixed gaze upon the display 212, as they may be looking back and forth from the road to the display 212. Image recognition may be used to detect whether the eyes of the user are looking upon the front-facing camera 221, and thus, over time, may be used to determine whether the user has a fixed gaze upon the display 212. In some cases, the user may be invited to maintain a fixed gaze for a predetermined amount of time in order to prove to the driver usage detection system 209 that he or she is not a driver, has stopped driving the vehicle, or otherwise is able to drive the vehicle without having to look at the road.

In another approach, a user may be determined to be a driver based upon proximity of the mobile device 112 to a signal of a vehicle that indicates a driver's position. For example, the mobile device 112 may detect a near-field signal emitted from a driver's seat, driver-side dashboard, etc., and proximity to the signal source, subject to various thresholds, may result in a driver classification. In one embodiment, the vehicle may report in a signal whether a person is seated in a driver's seat, whether a person is seated in a passenger's seat, and so on. If the driver is the only person seated in the vehicle, the driver usage detection system 209 may then infer that the user is the driver.

In yet another approach, a rear-facing camera 224 (FIG. 1) may be used to determine whether images captured from the rear-facing camera 224 show a portion of a steering wheel, road features viewed through the windshield, and/or the driver's side dashboard. Images from the front-facing camera 221 may be used in conjunction with images from the rear-facing camera 224 to determine whether the user is looking at the display 212 while the rear-facing camera 224 is capturing the driver-side feature. Such processing may occur in the mobile device 112 or may involve a request to the driver identification service 318 (FIG. 3) in order to perform at least some of the processing (e.g., image recognition) server-side.

In some embodiments, multiple ones of these approaches may be used in order to perform a multi-factor determination of whether the user is likely to be a driver. In any case, the raw confidence score may be compared against a threshold in order to make a determination. In various embodiments, the threshold may be more conservative, thereby avoiding misclassification as drivers, or more liberal, thereby avoiding misclassification as non-drivers.

If the user is determined not to be a driver, the driver usage detection system 209 continues to box 415 and reports that the user of the mobile device 112 is a non-driver user. Thereafter, the portion of the driver usage detection system 209 ends.

If the user is determined to be a driver, the driver usage detection system 209 moves from box 421 to box 424 and reports that the user is a driver. Additional information reported may include location, speed, determination confidence, factors weighing in the determination, and so on. Thereafter, the portion of the driver usage detection system 209 ends.

Figure 5:
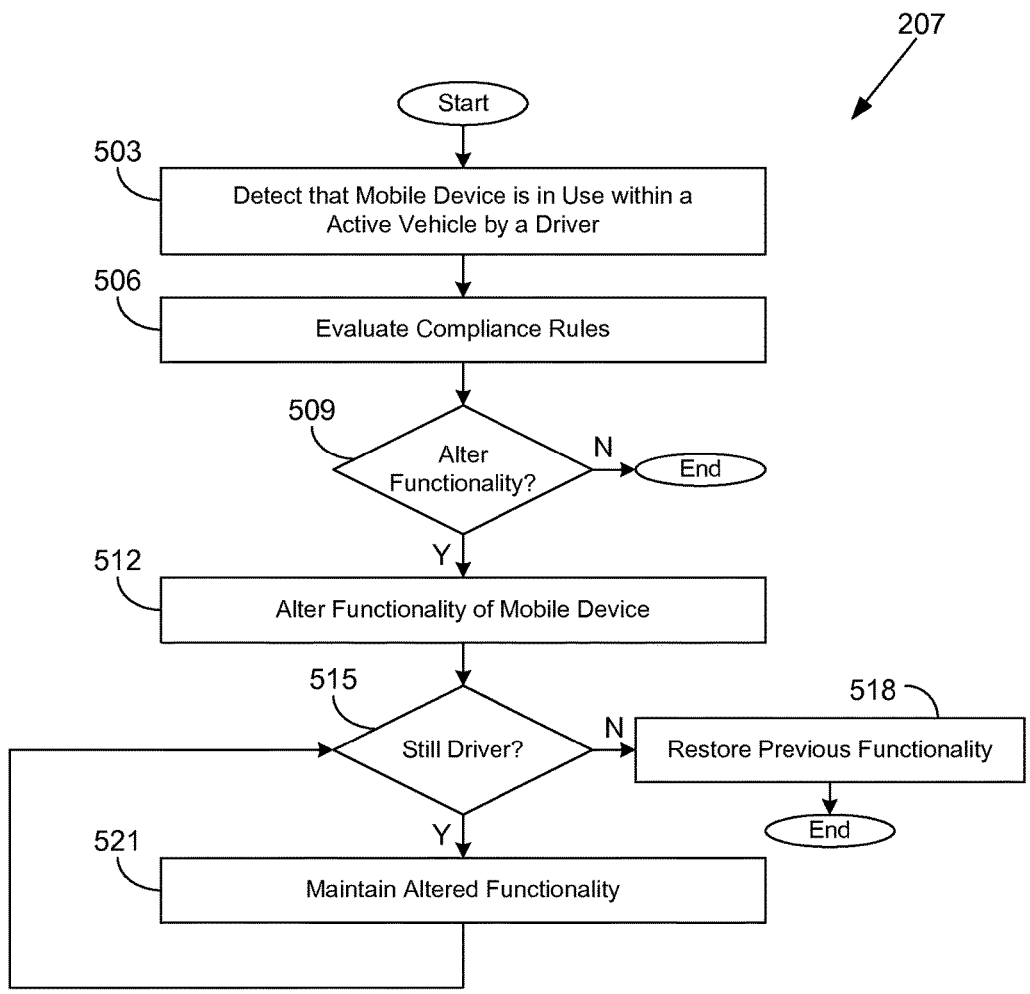
FIG. 5 is a flowchart illustrating one example of functionality implemented as portions of a management system executed in the mobile device of FIG. 2 according to various embodiments of the present disclosure.

Turning now to FIG. 5, shown is a flowchart that provides one example of the operation of a portion of the management system 207 according to various embodiments. It is understood that the flowchart of FIG. 5 provides merely an example of the many different types of functional arrangements that may be employed to implement the operation of the portion of the management system 207 as described herein. As an alternative, the flowchart of FIG. 5 may be viewed as depicting an example of elements of a method implemented in mobile device 112 (FIG. 2) according to one or more embodiments.

Beginning with box 503, the management system 207 detects that the mobile device 112 is in use within an active vehicle by a driver. For example, the driver usage detection system 209 (FIG. 2) may report that a driver is detected in a vehicle having a given speed. In box 506, the management system 207 evaluates one or more compliance rules 245 (FIG. 2) to determine whether to alter the functionality of the mobile device 112. Various inputs to the compliance rules 245 may include, for example, the identity and privileges granted to the current user of the mobile device 112, the confidence of the determination, the speed of the vehicle, whether the user has requested to bypass restrictions, location relative to general geographic restrictions (e.g., county, state, country), location relative to specific geographic restrictions (e.g., a particular highway lane), current time relative to time restrictions, and so on. In one embodiment, functionality may be disabled when the user is traveling below a certain minimum speed. For example, it may be observed that a user can more safely view a text message when traveling at least 60 miles per hour on a highway, as opposed to 30 miles per hour in stop-and-go traffic.

In box 509, the management system 207 decides whether to alter the functionality of the mobile device 112. In various embodiments, a user interface 233 may be rendered prompting the user to indicate whether the functionality should be altered. In some cases, this information may be communicated using a text-to-speech interface 232 (FIG. 2), and the user may respond with voice commands. If the functionality is not to be altered, the portion of the management system 207 ends. In one embodiment, if the user has intentionally bypassed the altering of the functionality, a notification may be sent to an administrative system. If the functionality is to be altered, the management system 207 continues from box 509 to box 512.

In box 512, the management system 207 alters functionality of the mobile device 112. Various types of functionality may be altered, as specified in the compliance rules 245. For example, the use of certain managed applications 203 (FIG. 2) and/or application data 239 (FIG. 2) corresponding to managed applications 203 may be disabled. Disabling managed applications 203 may be important for ensuring employee safety and/or reducing potential employer liability. The use of various hardware and/or software features of the mobile device 112 may be limited. For example, use of an on-screen keyboard may be denied. In one embodiment, a restricted version of an application may be enabled, while a non-restricted version of the application may be disabled.

In one embodiment, the display 212 (FIG. 2) is disabled or limited, and the use of a text-to-speech interface 232 may be required. Thus, the management system 207 may automatically configure the mobile device to read out a message in lieu of showing the message on the display 212. In some cases, the use of a hands-free interface 231 (FIG. 2) may automatically be required. In one embodiment, the management system 207 selectively enables a proper subset of notification types for the mobile device 112. For example, certain notification types (e.g., incoming email, incoming text message, etc.) may be quarantined while the user is driving, or at least until the vehicle comes to a stop or is traveling at a certain minimum speed. In one embodiment, automated replies to received messages by the mobile device 112 may be enabled. For example, when the user receives a text message, a text message of "Sorry, I am currently driving, but I will return your message as soon as possible" or another predefined message may be automatically sent in reply. Alternatively, the user may be permitted to select from a set of predefined text messages. For example, a user interface of the mobile device 112 may present buttons or other components corresponding to specific choices of predefined text messages.

In box 515, the management system 207 assesses again whether the user is still classified as a driver. This assessment may be performed periodically or in response to detecting a specified event, e.g., a location change. If so, the management system 207 maintains the altered functionality in box 521 and returns to box 515. If the user is no longer classified as a driver, the management system 207 restores the previous functionality in box 518. For example, the user of the mobile device may have performed a certain predefined task to prove that he or she is not a driver (e.g., maintaining a fixed gaze at the front-facing camera 221 (FIG. 2), gripping the mobile device 112 with both hands, etc.), or at least request a bypass of the limited functionality (e.g., in an emergency situation). Alternatively, the vehicle may no longer be in motion, or the current user of the mobile device 112 may be determined to no longer be the driver (e.g., the driver becomes a passenger, or the driver passes the mobile device 112 to a passenger for use by the passenger). In one embodiment, at least a portion of disabled functionality may be restored when the driver resumes at least a certain predefined speed, which is greater than the speed at which the functionality was disabled. Thereafter, the portion of the management system 207 ends.

It is noted that some or all of the functions of the management system 207 described in connection with FIG. 5 may be performed alternatively in a server, as by the device management system 312 (FIG. 3). The device management system 312 may instruct a local management system 207 to enable or disable functionality of the mobile device 112.

Figure 6:
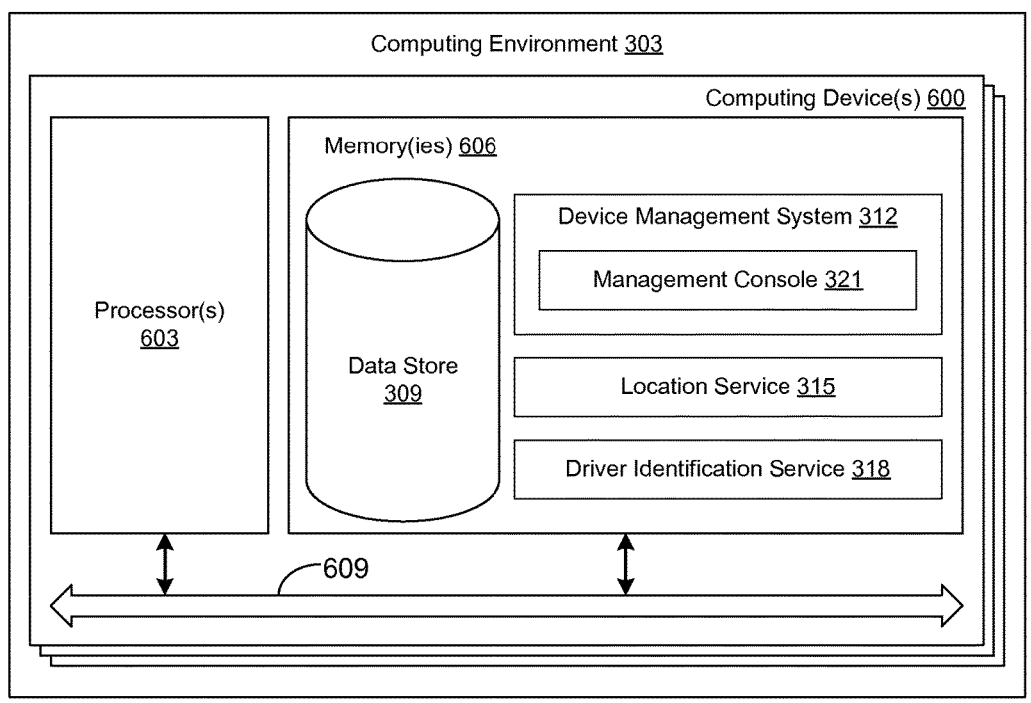
FIG. 6 is a schematic block diagram that provides one example illustration of a computing environment employed in the networked environment of FIG. 3 according to various embodiments of the present disclosure.

With reference to FIG. 6, shown is a schematic block diagram of the computing environment 303 according to an embodiment of the present disclosure. The computing environment 303 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the device management system 312, the management console 321, the location service 315, the driver identification service 318, and potentially other applications. Also stored in the memory 606 may be a data store 309 and other data. In addition, an operating system may be stored in the memory 606 and executable by the processor 603.

Figure 7:
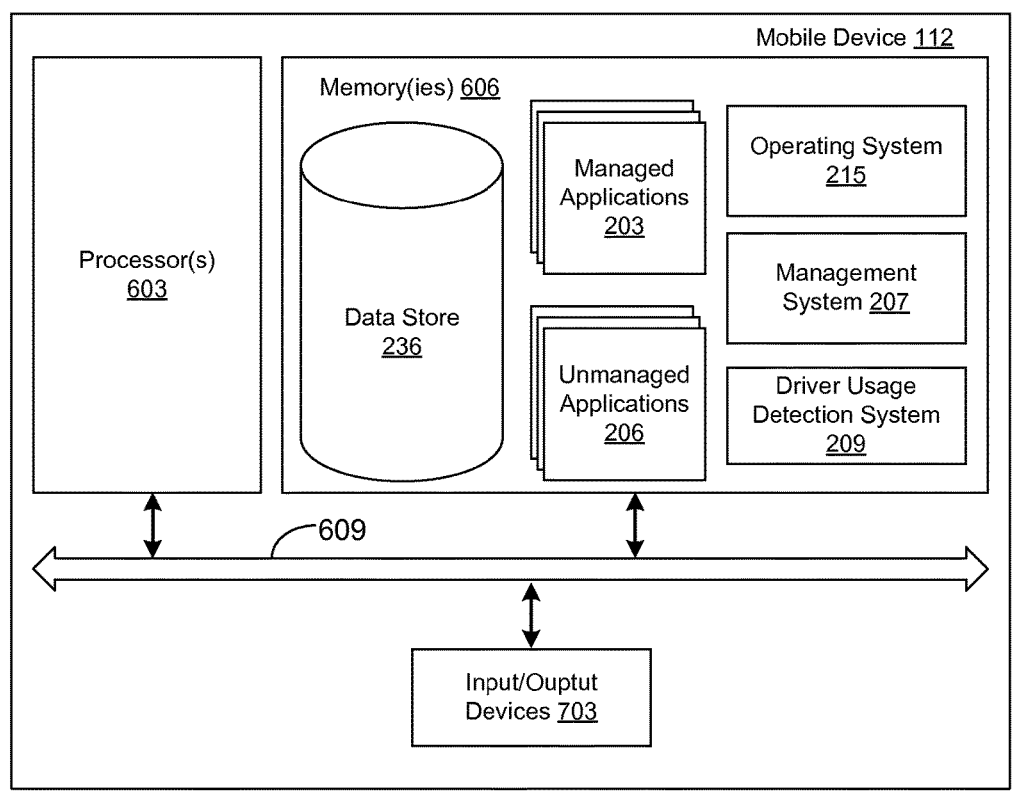
FIG. 7 is a schematic block diagram that provides another example illustration of the mobile device of FIG. 2 according to various embodiments of the present disclosure.

With reference to FIG. 7, shown is a schematic block diagram of the mobile device 112 according to an embodiment of the present disclosure. The mobile device 112 includes at least one processor circuit, for example, having a processor 603 and a memory 606, both of which are coupled to a local interface 609. The local interface 609 may comprise, for example, a data bus with an accompanying address/control bus or other bus structure as can be appreciated. The local interface 609 may be coupled to a variety of input/output devices 703, such as a display 212 (FIG. 2), a location system 218 (FIG. 2), front-facing cameras 221 (FIG. 2), rear-facing cameras 224 (FIG. 2), network interfaces 227 (FIG. 2), audio devices 228 (FIG. 2), sensors 230 (FIG. 2), and so on.

Stored in the memory 606 are both data and several components that are executable by the processor 603. In particular, stored in the memory 606 and executable by the processor 603 are the managed applications 203, the unmanaged applications 206, the management system 207, the driver usage detection system 209, and potentially other applications. Also stored in the memory 606 may be a data store 236 and other data. In addition, an operating system 215 may be stored in the memory 606 and executable by the processor 603. Various code implementing the hands-free interface 231 (FIG. 2) and the text-to-speech interface 232 (FIG. 2) may also be included in the memory 606.

Referring now to both FIGS. 6 and 7, it is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the managed applications 203, the unmanaged applications 206, the management system 207, the driver usage detection system 209, the device management system 312, the management console 321, the location service 315, the driver identification service 318, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the driver usage detection system 209 and the management system 207. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the managed applications 203, the unmanaged applications 206, the management system 207, the driver usage detection system 209, the device management system 312, the management console 321, the location service 315, and the driver identification service 318, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the managed applications 203, the unmanaged applications 206, the management system 207, the driver usage detection system 209, the device management system 312, the management console 321, the location service 315, and the driver identification service 318, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   determine that a mobile device is in use in a moving vehicle based at least in part on a plurality of global positioning system (GPS) readings of the mobile device that indicate that the mobile device is in motion beyond a first predefined speed;
   determine that the mobile device is in use by a driver of the moving vehicle based at least in part on a lack of a fixed gaze by the driver upon the mobile device, the lack of the fixed gaze being detected via a camera of the mobile device;
   restrict a functionality of the mobile device based at least in part on determining that the mobile device is in use by the driver of the moving vehicle; and
   restore at least a portion of the restricted functionality of the mobile device based at least in part on determining that the moving vehicle is maintaining at least a second predefined speed, the second predefined speed being greater than the first predefined speed.

2. The non-transitory computer-readable medium of claim 1, wherein when executed the program further causes the at least one computing device to at least:
   receive a request from the driver to bypass a restriction of the functionality;
   restore the functionality of the mobile device in response to the request from the driver to bypass the restriction; and
   send a notification to an administrator that the restriction has been bypassed.

3. A method, comprising:
   receiving, by a mobile device from a server, information indicating one or more restrictions to a functionality of the mobile device;
   detecting, by at least one computing device comprising the mobile device, that the mobile device is in use by a driver within an active vehicle, wherein detecting that the mobile device is in use by the driver of the active vehicle further comprises:
      determining, by the at least one computing device, a current location of the mobile device;
      comparing, by the at least one computing device, the current location of the mobile device to a route employed by a mass transportation vehicle; and
      determining, by the at least one computing device, that the active vehicle does not correspond to the mass transportation vehicle; and
   applying, by the at least one computing device, the one or more restrictions to the functionality of the mobile device in response to detecting that the mobile device is in use by the driver within the active vehicle.

4. The method of claim 3, wherein detecting that the mobile device is in use by the driver within the active vehicle further comprises determining, by the at least one computing device, that the active vehicle is in motion.

5. The method of claim 3, wherein detecting that the mobile device is in use by the driver within the active vehicle further comprises determining, by the at least one computing device, that the active vehicle is turned on.

6. The method of claim 3, further comprising:
restoring, by the at least one computing device, a previous functionality of the mobile device in response to determining at least one of:
that a user of the mobile device has performed a predefined task;
that the active vehicle is no longer in motion; or
that the user of the mobile device is no longer the driver.

7. The method of claim 3, wherein applying the one or more restrictions to the functionality of the mobile device further comprises automatically configuring the mobile device to use a text-to-speech functionality to produce an auditory representation of a message using an audio device in lieu of showing the message on a display.

8. The method of claim 3, wherein applying the one or more restrictions to the functionality of the mobile device further comprises automatically configuring the mobile device to require use of a hands-free interface.

9. The method of claim 3, wherein applying the one or more restrictions to the functionality of the mobile device further comprises selectively enabling a proper subset of a plurality of notification types for the mobile device based at least in part on the one or more restrictions.

10. The method of claim 3, wherein applying the one or more restrictions to the functionality of the mobile device further comprises automatically enabling an automated reply to a received message by the mobile device.

11. The method of claim 3, wherein applying the one or more restrictions to the functionality of the mobile device further comprises disabling use of at least one application via the mobile device.

12. The method of claim 3, wherein detecting that the mobile device is in use by the driver of the active vehicle further comprises detecting, by the at least one computing device, a signal emitted by the active vehicle.

13. The method of claim 3, wherein detecting that the mobile device is in use by the driver of the active vehicle further comprises:
capturing, by a camera of the mobile device, a sequence of images; and
determining, by the at least one computing device, that a person visible in the sequence of images does not have a fixed gaze upon a display of the mobile device.

14. The method of claim 3, wherein detecting that the mobile device is in use by the driver of the active vehicle further comprises:
capturing, by a camera of the mobile device, at least one image; and
determining, by the at least one computing device, that the at least one image depicts a portion of the active vehicle from a viewpoint of the driver.

15. The method of claim 3, further comprising:
detecting, by the at least one computing device, a speed of the active vehicle; and
wherein the one or more restrictions to the functionality of the mobile device are applied based at least in part on the speed of the active vehicle.

16. The method of claim 3, further comprising selectively enabling, by the at least one computing device, the one or more restrictions based at least in part on a current time.

17. A mobile device, comprising:
instructions embedded in a memory that, when executed by a processor, cause the processor to at least:
receive information from a server specifying one or more restrictions on usage of the mobile device;
determine that the mobile device is in use by a driver within an active vehicle;
restrict a functionality of the mobile device according to the one or more restrictions based at least in part on determining that the mobile device is in use by the driver within the active vehicle;
receive a request from the driver to bypass a restriction of the functionality;
restore the functionality of the mobile device in response to the request from the driver to bypass the restriction; and
send a notification to an administrator that the restriction has been bypassed.

18. The mobile device of claim 17, wherein the one or more restrictions pertain to a plurality of mobile devices managed by an organization.

19. The mobile device of claim 17, wherein the one or more restrictions are selectively enabled based at least in part on a current time.

20. The mobile device of claim 17, wherein the instructions, when executed by the processor, further cause the processor to at least receive updated information from the server specifying an update to the one or more restrictions.

21. The mobile device of claim 17, wherein the instructions, when executed by the processor, further cause the processor to at least restore at least a portion of the restricted functionality of the mobile device based at least in part on determining that the active vehicle is maintaining at least a predefined speed.

22. The mobile device of claim 17, wherein determining that the mobile device is in use by the driver of the active vehicle further comprises at least one of:
determining that the mobile device is not moving along a scheduled route of a mass transportation vehicle; or
determining that the mobile device does not detect a predetermined signal associated with the mass transportation vehicle.

23. The mobile device of claim 17, wherein determining that the mobile device is in use by the driver of the active vehicle further comprises determining that a user of the mobile device is not looking at the mobile device with a fixed gaze.

24. The mobile device of claim 17, wherein restricting a functionality of the mobile device further comprises at least one of:
disabling use of a touchscreen display of the mobile device;
requiring use of a hands-free interface of the mobile device;
automatically enabling automated replies to received messages by the mobile device; or
automatically enabling a text-to-speech interface for at least one application of the mobile device.

25. The mobile device of claim 17, wherein restricting a functionality of the mobile device further comprises automatically enabling a restricted version of an application in the mobile device in lieu of an unrestricted version of the application.

* * * * *